US006903242B2

(12) United States Patent
Terada et al.

(10) Patent No.: US 6,903,242 B2
(45) Date of Patent: Jun. 7, 2005

(54) METHOD FOR DEHALOGENATION TREATMENT OF HALOGEN CONTAINING NON-COMBUSTIBLE RESIN COMPOSITION

(75) Inventors: Takahiko Terada, Nara (JP); Hiroshi Onishi, Hirakata (JP); Tetsuji Kawakami, Katano (JP); Keizo Nakajima, Kawachinagano (JP); Takayoshi Ueno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 240 days.

(21) Appl. No.: 09/898,338

(22) Filed: Jul. 3, 2001

(65) Prior Publication Data

US 2002/0099253 A1 Jul. 25, 2002

(30) Foreign Application Priority Data

Jul. 3, 2000 (JP) ....................................... 2000-200658

(51) Int. Cl.[7] .................................................... C08F 6/00

(52) U.S. Cl. ........................ 588/206; 528/480; 528/176

(58) Field of Search .......................... 588/206; 528/176, 528/480

(56) References Cited

U.S. PATENT DOCUMENTS 6,162,894 A * 12/2000 Futamura .................... 528/480

FOREIGN PATENT DOCUMENTS

| | | | |
|---|---|---|---|
| EP | 1008395 | A2 * | 6/2000 |
| JP | 2000-44966 | | 2/2000 |
| JP | 2000-117738 | | 4/2000 |

* cited by examiner

*Primary Examiner*—Arun S. Phasge
(74) *Attorney, Agent, or Firm*—RatnerPrestia

(57) ABSTRACT

A dehalogenation treatment method of a halogen-containing flame-retardant resin composition has a step of bringing the halogen-containing flame-retardant resin composition into contact with a material mixture containing a dehalogenation material and a dehalogenation promoting material at a temperature lower than a thermal decomposition temperature of the resin composition.

23 Claims, 1 Drawing Sheet

(A)

(B)

(C)

(D)

METHOD FOR DEHALOGENATION TREATMENT OF HALOGEN CONTAINING NON-COMBUSTIBLE RESIN COMPOSITION

BACKGROUND OF THE INVENTION

1. Field of the Invention

The present invention relates to a method for dehalogenation treatment of a halogen-containing flame-retardant resin composition and relates to a method for preventing harmful substances such as dioxins generated at the time of burning resin compositions and promoting reuse of the resin.

2. Related Art of the Invention

In order to provide flame-retardability for resin such as epoxy resin, phenol resin, polystyrene resin and the like to be used for domestic electric appliances such as a television and appliances relevant to information such as a display, a personal computer and the like, a halogen-containing flame-retardant of such as decabromodiphenyl ether is added or a halogen is introduced into the resin skeleton. The halogen-containing flame-retardant evolves an active halogen when being heated so as to cover the surface of the resin composition and shut oxygen to provide a fire-retarding effect.

However, it has been well known that harmful halogenated dibenzodioxins and halogenated dibenzofurans are emitted when a halogen-containing flame-retardant resin composition is incinerated in a common refuse treatment apparatus.

Hence, regarding an unnecessary halogen-containing flame-retardant resin composition, techniques of detoxification have been developed. As disclosed in Japanese Patent Application Laid-Open No. 2000-117738, it is common to thermally decompose resin and remove and recover it in the forms of halogenated low molecular weight compounds and treatment is generally carried out at a high temperature, at 300° C. or higher. Also, as disclosed in Japanese Patent Application Laid-Open No. 2000-44966, the resin is hydrogenated and decomposed in the presence of a catalyst to remove and recover it in the forms of halogenated low molecular weight compounds. The treatment temperature is also high, 300 to 420° C., as in the case of the thermal decomposition. However, in these cases, since the resin is thermally decomposed or hydrogenated and decomposed, although an oil or a gas can be recovered to be reused, it cannot be reused as resin. Besides that, dioxins are probably produced by heating at the time of the treatment.

As described above, regarding a halogen-containing flame-retardant resin composition, no technique relevant to methods for promoting reuse of resin while detoxicating the halogen has been disclosed.

SUMMARY OF THE INVENTION

The present invention aims to provide a dehalogenation treatment method for a halogen-containing flame-retardant resin composition which is capable of dehalogenating the halogen-containing flame-retardant resin composition and also making the resin reusable without generating harmful halogenated dibenzodioxins and halogenated dibenzofurans in order to detoxicate halogens of the halogen-containing flame-retardant resin composition as a countermeasure against the above described problems.

In order to achieve the foregoing aim, the dehalogenation treatment method of the present invention for a halogen-containing flame-retardant resin composition comprises a step of bringing the halogen-containing flame-retardant resin composition into contact with a material mixture containing a dehalogenation material and a dehalogenation promoting material at a temperature lower than the thermal decomposition temperature of the foregoing resin composition.

Further, the dehalogenation treatment method of the present invention for a halogen-containing flame-retardant resin composition comprises a step of bringing a thermosetting resin, if the halogen-containing flame-retardant resin composition is the thermosetting resin, into contact with a material mixture containing a dehalogenation promoting material, which decomposes some of chemical bonds of the foregoing thermosetting resin and produces a resin raw material, and a dehalogenation material at a temperature not lower than 200° C. and lower than the thermal decomposition temperature of the foregoing thermosetting resin composition.

The dehalogenation promoting material which decomposes some of chemical bonds of the foregoing thermosetting resin and produces the resin raw material is preferably at least one substance selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone.

Also, in the case where the halogen-containing flame-retardant resin composition is a thermoplastic resin, the dehalogenation treatment method of the present invention for the halogen-containing flame-retardant resin composition comprises a step of brining the thermoplastic resin into contact with a material mixture containing a dehalogenation promoting material which can dissolve a halogen-containing flame-retardant and a dehalogenation material at a temperature lower than the thermal decomposition temperature of the foregoing thermoplastic resin composition.

Further, the dehalogenation promoting material which can dissolve a halogen-containing flame-retardant is preferably at least one substance selected from the group consisting of methyl chloride, dichloromethane, chloroform, carbon tetrachloride, bromoform, methanol, ethanol, 1-propanol, 2-propanol, 1-butanol, 2-butanol, isobutylalcohol, tert-butylalcohol, phenol, cresol, ethylene glycol, propylene glycol, diethylene glycol, dipropylene glycol, isoprene glycol, triethylene glycol, tetraethylene glycol, diethyl ether, dioxane, tetrahydrofuran, acetone, methyl ethyl ketone, 2-hexanone, 2-methyl-4-pentanone, phorone, isophorone, 2-heptanone, 4-heptanone, diisobutyl ketone, acetonylacetone, cyclohexanone, methylcyclohexanone, acetophenone, acetic acid, acetonitrile, diethylamine, triethylamine, N,N-dimethylformamide, N-methylpyrrolidone, dimethyl sulfoxide, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, polyethylene glycol, polypropylene glycol, and tetralin.

Further, the dehalogenation treatment method of the present invention for a halogen-containing flame-retardant resin composition comprises a step of brining a halogen-containing flame-retardant resin composition into contact with a material mixture containing a dehalogenation material and a dehalogenation promoting material at a temperature lower than the thermal decomposition temperature of the resin composition by kneading the resulting mixture while applying shear force.

Incidentally, the contact by kneading while applying shear force is preferably carried out by a biaxial kneading extruder, a kneader, or a rotation roll.

The dehalogenation material to be used for the above described methods is preferably at least one substance selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide.

The contact of a halogen-containing flame-retardant resin composition described above with a material mixture containing a dehalogenation material and a dehalogenation promoting material is preferably performed so as to bring the halogen-containing flame-retardant resin composition into contact with the foregoing material mixture in a liquid phase or/and a vapor phase.

Further, prior to the contact of the halogen-containing non-combustible thermosetting resin composition with the material mixture containing the dehalogenation material and the dehalogenation promoting material, it is preferable to eliminate oxygen from the contact ambient atmosphere for the contact.

Further, the oxygen elimination step is preferably a replacement step of replacing the gas of the ambient atmosphere with nitrogen gas by sending nitrogen gas and/or a pressure decrease step of decreasing the pressure by evacuating the gas of the ambient atmosphere by gas discharge.

Further, it is also preferable that a substance generated in the system in which the halogen-containing flame-retardant resin composition is brought into contact with the material mixture containing the dehalogenation promoting material and the dehalogenation material is passed through an alkaline solution.

In the above described description, the halogen in the halogen-containing flame-retardant resin composition preferably composes at least one compound selected from the group consisting of decabromodiphenyl ether, tetrabromobisphenol A, 2,2-bis(4-hydroxy-3,5-dibromophenyl) propane, hexabromobenzene, tris(2,3-dibromopropyl) isocyanurate, 2,2-bis(4-hydroxyethoxy-3,5-dibromophenyl) propane, perfluorocyclodecanethylenebis (pentabromobenzene), ethylene bistetrabromophthalimide, hexabromocyclododecane, a halogen-containing polyphosphate, paraffin chloride, pentabromotoluene, octabromodiphenyl oxide, tetrabromophthalic anhydride, brominated (alkyl)phenol, tris(tribromophenoxy)triazine, brominated polystyrene, octabromotrimethylphenylindane, pentabromobenzyl acrylate, polydibromophenylene oxide, bis(tribromophenoxyethane), tetrabromobisphenol A-epoxy oligomer/polymer, tetrabromobisphenol A-carbonate oligomer, tetrabromobisphenol A-bis(2,3-dibromopropyl ether), tetrabromobisphenol A-bis(allyl ether), and tetrabromobisphenol S.

Further, the halogen-containing flame-retardant resin composition is preferably a printed circuit board comprising a resin layered product produced by laminating prepregs each composed of at least one base material selected at least from the group consisting of a woven or non-woven fabric of glass fibers, a woven or non-woven fabric of polyester fibers, a woven or non-woven fabric of nylon fibers, a woven or non-woven fabric of acrylic fibers, a woven or non-woven fabric of aramide fibers, paper, mica paper, cotton cloth, and asbestos and epoxy or phenol resin with which the base material is impregnated; a conductor pattern formed on the base material, and electronic parts incorporated into the base material.

Further, a preferable example of the halogen-containing flame-retardant resin composition is a box body of a television, a display, or a personal computer and a pulverization step is preferably involved prior to the contact with the material mixture containing the dehalogenation material and the dehalogenation promoting material.

Further, a preferable example of the halogen-containing flame-retardant resin composition is a composite covering a metal wire and the metal is preferably separated by bringing composite into contact with the material mixture containing the foregoing dehalogenation material and dehalogenation promoting material.

Figure 1:
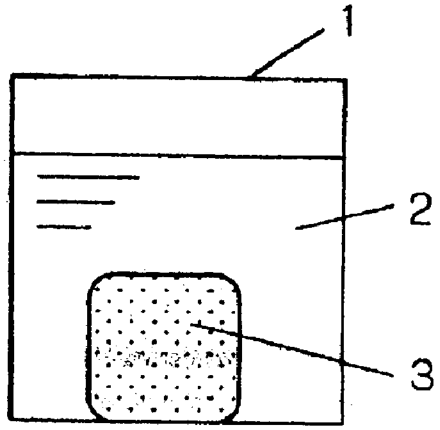
FIG. 1(A) to (D) are schematic cross-sectional views for description of the embodiments of the present invention.
Figure 1:
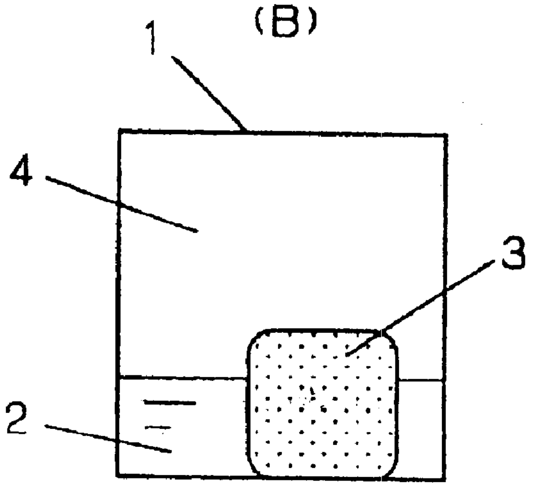
Figure 1:
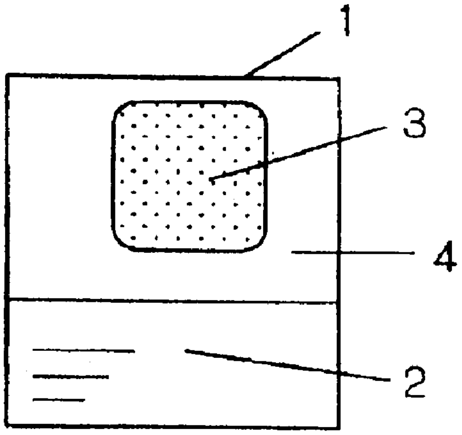
Figure 1:
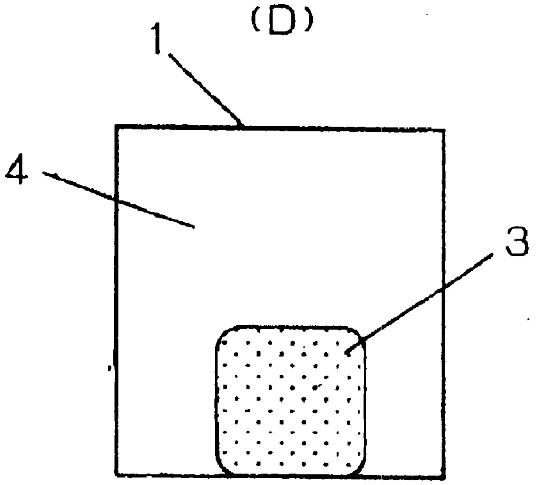

DESCRIPTION OF THE SYMBOLS 1 reaction tank
2 liquid phase of material mixture
3 halogen containing flame-retardant resin composition
4 vapor phase of material mixture

PREFERRED EMBODIMENTS OF THE INVENTION

Hereinafter, an embodiment of the present invention will be described.

A halogen-containing flame-retardant resin composition to be employed for the treatment method of the present invention is a composition containing solely resin or produced by mixing a filler material as a binder, a base material, or additives, kneading the resulting mixture, and subjected to hardening reaction. Those usable as thermosetting resin are, for example, unsaturated polyester resin, phenol resin, epoxy resin, polyurethane resin, melamine resin, urea resin and the like and those usable as thermoplastic resin are polystyrene, ABS resin, polyethylene, polypropylene, polycarbonate, PBT resin, PET resin, poly(vinyl chloride) resin and the like.

Examples of a thermosetting resin composition containing unsaturated polyester resin as a binder are molded products of BMC, SMC and the like mixed with a filler, a thickener, a release agent, a wax, and a coloring agent, lining materials mixed with flakes and fibers of glass, coating materials mixed with waxes, putty mixed with fillers, resin concrete mixed with aggregates and fillers, artificial marble mixed with fillers and pigments, foams mixed with foaming agents, adhesives mixed with hardening accelerators and stabilizer, and the like.

Those to be used as the fillers and the aggregates of the resin compositions are carbonates such as calcium carbonate and magnesium carbonate, sulfates and sulfites such as calcium sulfate, barium sulfate, and calcium sulfite, silicates such as clay, mica, glass balloon, montmorillonite, silicic acid, kaolin, and talc, oxides such as silica, diatomaceous earth, iron oxide, pumiceous balloon, titanium oxide, and alumina, hydroxides such as aluminum hydroxide and magnesium hydroxide, inorganic fillers such as graphite, glass fiber, carbon fiber, and asbestos fibers, and organic fillers such as wood powder, rice husk, cotton, paper segments, nylon fibers, polyethylene fibers, wood, pulp, and cellulose.

Those to be used as the thickener are beryllium oxide, magnesium oxide, magnesium hydroxide, calcium oxide, calcium hydroxide, zinc oxide, benzoic acid, phthalic anhydride, tetrahydrophthalic anhydride, and maleic anhydride.

Those to be used as the release agent are stearic acid, zinc stearate, calcium stearate, and the like.

Those to be used as the wax are Hoechst wax, carnauba wax, paraffin wax and the like.

Those to be used as the coloring agent are titanium white, chromium oxide, carbon black and the like.

Also, as a resin hardened product using urea resin, melamine resin or the like as a binder, examples include a molded product, an adhesive, and a coating material mixed with similar fillers, base materials, and additives similar to unsaturated to polyester resin.

Further, also in case of using polyurethane resin as a binder, examples include a resin hardened product mixed with additives similar to unsaturated polyester resin, mainly foamed resin, coating materials, and adhesives.

Also, other than compositions similar to the above described thermosetting resin compositions using the unsaturated polyester resin as a binder, the examples of a thermosetting resin composition containing phenol resin as a binder include resin layered products produced by laminating prepregs each composed of a base material of mat-like glass fibers, a woven fabric of glass fibers, a woven or non-woven fabric of nylon fibers, a woven or non-woven fabric of acrylic fibers, a woven or non-woven fabric of polyester fibers, cotton cloth, and asbestos and resol type phenol resin with which the base material is impregnated. If a copper foil coated with an adhesive is further put on and laminated on the products, copper-clad laminates can be obtained.

Also, as the same as the examples in case of using phenol resin other than similar examples using unsaturated polyester resin, the examples of the thermosetting resin compositions using epoxy resin as a binder include resin layered products produced by laminating prepregs each composed of a base material of a woven or non-woven fabric of glass fibers, a woven or non-woven fabric of polyester fibers or aramide fibers, paper, and mica paper and epoxy resin with which the base material is impregnated. In this case also, a copper foil coated with an adhesive is put and laminated on the products to give copper-clad laminates. The copper paste is also a thermosetting resin composition containing epoxy resin as a binder.

Besides, thermosetting resin compositions containing thermosetting resin such as polyimide resin as a binder are objects to be treated with the treatment method of the present invention for a halogen-containing flame-retardant resin composition.

Further, as thermoplastic resin composition, for example, polystyrene is employed. Polystyrene is used solely in some cases, however in many cases a filler, a reinforcing fiber, a release agent, a wax, a coloring agent, and the like are used together. Since polystyrene is excellent in electric insulation and waterproofness, it is employed as a cabinet, a housing, a panel of a television and a personal computer for electric industrial products and also in other fields such as a construction material of furniture, daily utensils and the like. Further, there is available impact resistant polystyrene graft polymerized with polybutadiene in order to increase the impact resistance. Alternatively, foamed polystyrene is employed as a buffering material and a heat insulating material.

Besides, similarly being mixed with a filler, a reinforcing fiber, a release agent, a wax, and a coloring agent, polycarbonate, PET resin, PBT resin, vinyl chloride resin, and the like are also used in the forms of compositions for domestic goods, construction materials, automotive parts, tools, machine parts, electric appliances, molded products of electric insulation materials, optical disks, magnetic disks, pipes and tubes, fibers, laminates, coatings, films and sheets.

A halogen-containing flame-retardant resin composition to be subjected to the dehalogenation treatment method of the present invention includes those containing a halogen-containing flame-retardant as an additive (an addition type) and those having a non-combustible structure containing halogens in the resin skeleton (a reaction type) In the case of the reaction type, the resin itself is a flame-retardant. A halogen bears the fire-retarding mechanism of such a flame-retardant. When a resin composition is heated, the halogen becomes an active halogen and covers the surface of the resin composition to shut oxygen and make it difficult to burn the resin composition.

The halogen showing the fire-retarding function exists in a resin composition in the forms of at least one compound selected from the group consisting of decabromodiphenyl ether, tetrabromobisphenol A, 2,2-bis(4-hydroxy-3,5-dibromophenyl)propane, hexabromobenzene, tris(2,3-dibromopropyl)isocyanurate, 2,2-bis(4-hydroxyethoxy-3,5-dibromophenyl)propane, perfluorocyclodecanethylenebis (pentabromobenzene), ethylene bistetrabromophthalimide, hexabromocyclododecane, a halogen-containing polyphosphate, paraffin chloride, pentabromotoluene, octabromodiphenyl oxide, tetrabromophthalic anhydride, brominated (alkyl)phenol, tris(tribromophenoxy)triazine, brominated polystyrene, octabromotrimethylphenylindane, pentabromobenzyl acrylate, polydibromophenylene oxide, bis(tribromophenoxyethane), tetrabromobisphenol A-epoxy oligomer/polymer, tetrabromobisphenol A-carbonate oligomer, tetrabromobisphenol A-bis(2,3-dibromopropyl ether), tetrabromobisphenol A-bis(allyl ether), and tetrabromobisphenol S. These non-combustible halogens are treated in optimum by the dehalogenation treatment method of the present invention. Further, these non-combustible halogens sometimes exist as additives in resin compositions and sometimes exist as reaction types just like epoxy resin having resin skeleton with a tetrabromobisphenol A structure formed by adding bromine to the benzene rings of bisphenol A, which are main chain structural units of bisphenol A type epoxy resin and poly (vinyl chloride) resin containing chlorine in the skeleton.

The dehalogenation promoting material for decomposing some of chemical bonds of thermosetting resin to be subjected to the dehalogenation treatment method of the present invention and producing resin raw materials includes at least one substance selected from the group consisting of, for example, ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone.

The above described dehalogenation promoting materials are brought into contact with a halogen-containing flame-retardant resin composition at 200° C. or higher and lower than the thermal decomposition temperature to chemically decompose the resin based on the function of the dehalogenation promoting materials. Different from the thermal decomposition accompanied with a large quantity of low molecules such as gases and oils; the chemical decomposition is a relatively moderate decomposition reaction of partially decomposing the cross-linking chains of the resin. Even in the case of a thermosetting resin such as epoxy resin, the three-dimensional cross-linking chains can chemically decomposed by the dehalogenation promoting materials. Even in the case of a thermosetting resin such as epoxy resin, which is conventionally hard to decompose, the resin can be efficiently decomposed by the above exemplified dehalogenation promoting materials.

Owing to the decomposition of the resin, a halogen-containing flame-retardant resin composition is disintegrated. That is, the halogen-containing flame-retardant resin composition can no more keep the shape being kept by the restriction of hardening or molding. Consequently, the composition constituent molecules positioned in the inside and the additives such as a flame-retardant contained in the resin are easily exposed. The compounds containing halogens are also easily exposed to a material mixture. Consequently, the reaction opportunities with the dehalogenation material contained in the material mixture increase and as a result, the dehalogenation function is effectively drawn to eliminate halogens. The reaction of the halogen-containing flame-retardant resin composition is effective especially with the above exemplified dehalogenation material. Also, even in the case of a reaction type flame-retardant containing halogens in the resin skeleton, owing to the decomposition and disintegration of the resin, the reaction opportunities with the dehalogenation material contained in the material mixture similarly increase to efficiently draw the dehalogenation function and result in elimination of an increased amount of halogens.

Incidentally, although the resin is decomposed, not like a case of thermal decomposition, it is not decomposed into gases or oils and resin constituent monomers are recovered, so that the recovered monomers can be reused as a resin raw material.

Further, the dehalogenation promoting material to dissolve a halogen-containing flame-retardant to be employed for the dehalogenation treatment method of the present invention is preferably at least one compound selected from the group consisting of methyl chloride, dichloromethane, chloroform, carbon tetrachloride, bromoform, methanol, ethanol, 1-propanol, 2-propanol, 1-butanol, 2-butanol, isobutylalcohol, tert-butylalcohol, phenol, cresol, ethylene glycol, propylene glycol, diethylene glycol, dipropylene glycol, isoprene glycol, triethylene glycol, tetraethylene glycol, diethyl ether, dioxane, tetrahydrofuran, acetone, methyl ethyl ketone, 2-hexanone, 2-methyl-4-pentanone, phorone, isophorone, 2-heptanone, 4-heptanone, diisobutyl ketone, acetonylacetone, cyclohexanone, methylcyclohexanone, acetophenone, acetic acid, acetonitrile, diethylamine, triethylamine, N,N-dimethylformamide, N-methylpyrrolidone, dimethyl sulfoxide, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, polyethylene glycol, polypropylene glycol, and tetralin.

The above described dehalogenation promoting materials become remarkably excellent solvents by being brought into contact with a halogen-containing flame-retardant at a temperature lower than the thermal decomposition temperature of the resin to dissolve the flame-retardant. The flame-retardant is, therefore, evenly dispersed in the dehalogenation promoting materials and provides an even reaction system for the dehalogenation promoting materials, so that the dehalogenation reaction can be promoted.

Incidentally, in the case of a reaction type flame-retardant in which halogens exist in the resin skeleton, the resin itself is dissolved in the dehalogenation promoting material.

Further, the dehalogenation promoting material preferably has an affinity to the resin. This is because the dissolution of the flame-retardant dispersed in the resin is more promoted owing to the affinity to the resin.

Incidentally, since the resin is dissolved but is not affected or decomposed, it can be reused as a resin material again.

The dehalogenation material to be employed for the dehalogenation treatment method of the present invention is one or more of substances selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide.

As a material mixture mixed with the above described dehalogenation promoting materials, these dehalogenation materials are brought into contact with a halogen-containing flame-retardant resin composition. Incidentally, the dehalogenation materials may be dissolved or dispersed in the dehalogenation promoting materials.

These dehalogenation materials are mixed in 0.1 to 50 parts by weight, preferably 1 to 10 parts by weight with respect to 100 parts by weight of the dehalogenation promoting materials.

Further, tetralin is a dehalogenation promoting material and also a dehalogenation material. Consequently, sometimes the material mixture becomes solely tetralin in the case where tetralin is selected from both groups.

As described above, according to the treatment method of the present invention for a halogen-containing flame-retardant resin composition, the dehalogenation reaction is made easy and halogens can be eliminated from the halogen-containing flame-retardant resin composition and the resin can be made reusable.

In the present invention, the contact of the material mixture with a halogen-containing flame-retardant resin composition does not necessarily require the resin composition to be completely immersed in the material mixture in the liquid phase (refer to FIG. 1(A)). Some of the resin composition may be immersed in the material mixture in the liquid phase and some may be exposed to the material mixture in the vapor phase (refer to FIG. 1(B)) or the resin composition may be entirely exposed to the vapor phase without being immersed in the liquid phase (refer to FIG. 1(C)). Further, only the vapor phase of the material mixture exists and the resin composition may be exposed to the vapor phase (refer to FIG. 1(D)). Further, the material mixture, as described above, may exist both in the liquid phase and the vapor phase. The possibility of the reaction with the material mixture in the vapor phase makes it possible to considerably decrease the amount to be used for the treatment. Incidentally, in FIG. 1, the reference numeral 1 denotes a reaction tank, 2 denotes the liquid phase of the material mixture, 3 denotes a halogen-containing flame-retardant resin composition, and 4 denotes the vapor phase of the material mixture.

Further, in the present invention, mechanical pressure may be applied in order to promote the contact of a halogen-containing flame-retardant resin composition with a material mixture of a dehalogenation promoting material and a dehalogenation material.

One preferable example is shear force. Shear force is applied to a system containing a material mixture of a dehalogenation promoting material and a dehalogenation material and a halogen-containing flame-retardant resin composition, so that the material mixture and the halogen-containing flame-retardant resin composition are well mixed and distributed and owing to the pressure application, decomposition, dissolution, and the reaction opportunities are considerably intensified and increased to result in remarkable increase of the efficiency of the dehalogenation treatment of the present invention.

Examples of apparatuses for the shear force application step are a biaxial kneading extruder, a kneader, and a rotation roll. In any apparatus, the dehalogenation efficiency can be improved by optimizing the pressure, the rotation speed, and the blades.

Further, in the present invention, in order to obtain a high reaction speed for the partial decomposition of the thermosetting resin by the dehalogenation promoting material, high temperature is preferable and especially at 200° C. or higher, the decomposition is remarkably accelerated. However, if the temperature is too high, thermal decomposition takes place and the pressure is increased and therefore a high pressure resistant reaction container is required, reuse as resin is made difficult owing to the increase of the amounts of gases and oils to be produced by the decomposition, the decomposition of the material mixture itself becomes a matter, and deterioration reactions of a filler contained in a halogen-containing flame-retardant resin composition are activated and hence, the temperature at the time of bringing the resin into contact with the material mixture is preferably lower than the thermal decomposition temperature of the resin. Like that, in the case where the halogen-containing flame-retardant resin composition is a thermosetting resin, it is preferable to heat at 200° C. or higher and at the temperature lower than the thermal decomposition temperature of the foregoing thermosetting resin compositions.

Further, also in case of dissolving thermoplastic resin by a dehalogenation promoting material, the temperature is preferably high, however if it is too high, thermal decomposition takes place and the pressure is increased and therefore a high pressure resistant reaction container is required, reuse as resin is made difficult owing to the increase of the amounts of gases and oils to be produced by the decomposition, the decomposition of the material mixture itself becomes a matter, and deterioration reactions of a filler contained in a halogen-containing flame-retardant resin composition are activated and hence, the temperature at the time of bringing the resin into contact with the material mixture is preferably lower than the thermal decomposition temperature of the resin. In case of using polystyrene as a resin, the thermal decomposition temperature is 300° C. Like that, if a halogen-containing flame-retardant resin composition is thermoplastic resin, it is preferable to carry out heating at the temperature lower than the thermal decomposition temperature of a thermoplastic resin composition.

As described above, the temperature for contact with a material mixture of a dehalogenation promoting material and a dehalogenation material is preferably at a temperature not higher than the thermal decomposition temperature.

Further, in the treatment method of the present invention, since a dehalogenation material has a function of preventing oxidation deterioration of a dehalogenation promoting material, the dehalogenation promoting material is scarcely deteriorated by heating and can be used repeatedly.

Further in the present invention, in order to prevent the oxidation deterioration of the dehalogenation promoting material or in order to prevent the oxidation deterioration of fillers contained in a halogen-containing flame-retardant resin composition, a step of eliminating oxygen in the ambient atmosphere for the contact may be added. One example of the step of eliminating oxygen is a step of replacing the gas of the ambient atmosphere for the contact with nitrogen by sending nitrogen. Sending nitrogen can be carried out by installing a gas introduction pipe and a gas discharge valve in a tank loaded with a halogen-containing flame-retardant resin composition and the material mixture and directly sending nitrogen from a nitrogen gas bomb.

As another example is a step of eliminating a gas of the ambient atmosphere for contact by decreasing the pressure. Decreasing the pressure can be carried out by installing a gas discharge valve in a tank loaded with a halogen-containing flame-retardant resin composition and the material mixture and laying a vacuum pump in the pipeline. In both steps, the oxygen elimination efficiency can be increased by stirring the decomposition solution or properly heating the solution.

A preferable step is a step of replacing the gas in the decomposition solution with nitrogen by sending nitrogen and then vacuum-evacuating the gas from the decomposition tank.

By carrying out the treatment after the pretreatment of the oxygen elimination, deterioration by oxidation of a dehalogenation material can be prevented and made itself efficiently involved in the dehalogenation reaction. Further, oxidation, which is a main cause of deterioration of a dehalogenation promoting material at the time of high temperature reaction treatment, can be prevented and the life of the dehalogenation promoting material is prolonged to improve the repeated usability. Moreover, oxidation deterioration of metals composing fillers of a halogen-containing flame-retardant resin composition can be prevented and the grade of the separated and recovered substance can be improved.

In a treatment method of the present invention for a halogen-containing flame-retardant resin composition, dehalogenation reaction takes place in the flame-retardant resin composition and, for example, hydrogen halides and metal halides are produced. The generated substances are passed through an alkaline solution, so that the halogen compounds can also be recovered. As an alkaline substance for producing the alkaline solution, usable are alkali metal oxides, alkali metal hydroxides such as sodium hydroxide and potassium hydroxide, alkali metal alkoxides such as sodium ethoxide, alkaline earth metal oxides such as calcium oxide, alkaline earth metal hydroxides such as calcium hydroxide, alkaline earth metal alkoxides and amines. Also, as a solvent, usable are alcohols, glycols, ethers other than water. The halogen compounds recovered in the alkaline solution can be separated from the solvent by a step of concentration or the like and recovered and made reusable as halide salts.

Hereinafter, the present invention will be described more particularly with the reference to practical embodiments.

(Embodiment 1)

An embodiment of dehalogenation treatment method of the present invention for a halogen-containing flame-retardant resin composition will be described below.

In the present embodiment, given is a description of a dehalogenation treatment method of the present invention using a laminate as an example, which is a halogen-containing flame-retardant resin composition using epoxy resin as a binder.

An epoxy resin solution was obtained by mixing 4 parts by weight of methyl ethyl ketoxime-blocked 4-4'-diphenylmethane diisocyanate as a hardening agent, 100 parts by weight of a solvent mixture (45/55 weight ratio) of acetone and 2-methoxyethanol with 100 parts by weight of a non-combustible epoxy resin, which is obtained by tetrabromobisphenyl A reacting with epichlorohydrin.

After the glass fiber fabric was immersed in the epoxy resin solution, the solution was heated to evaporate the solvent and to produce a prepreg. Next, the prepreg was cut and laminated and a copper foil whose upper face was coated with a modified epoxy resin as an adhesive was put on and the resulting body was inserted into a press and hardened by heating and pressurizing to obtain a copper-laminated laminate, which was a halogen-containing flame-retardant resin composition.

Then, the laminate is brought into contact with a material mixture containing one or more of dehalogenation promoting materials selected from the group consisting of ethyleneglycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone and at least one dehalogenation material selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide, to carry out the treatment. In the present embodiment, tetralin as a dehalogenation promoting material and sodium hypophosphite as a dehalogenation material were selected to obtain the material mixture.

After a reaction container made of a stainless steel was loaded with the laminate which was immersed in the material mixture, the container was closed and after that, the container and all were heated at 270° C. for five hours. After that, the same treatment was carried out by changing the treatment temperature to 190, 200, 250, 300, 330° C. Further, treatment at 270° C. was also carried out in the same manner except that a vacuum pump was connected with a nozzle installed in a decomposition tank, the gas was evacuated from the reaction container to decrease the pressure and then the container was closed and heated. Also, after a reaction container made of a stainless steel was loaded with the laminate, the container was closed and kept heated at 270° C., the material mixture was blown through an introduction pipe connected to the inside of the reaction container by a high pressure solution sending pump and the container was heated for five hours. In this case, the laminate is constantly brought into contact with the vapor phase of the material mixture.

On completion of the reaction, after releasing heat and cooling to 100° C., while the temperature being kept at 100° C., nitrogen gas was blown and the gas discharged through an opened nozzle was passed through an aqueous sodium hydroxide solution and then discharged.

As a result, at first, in the case where the treatment temperature was 180° C., the shape of the copper-clad laminate, which was a flame-retardant resin composition, was kept although the discoloration trace was observed in the resin part of the laminate and the strength was scarcely changed. On the other hand, in the case of each treatment at 200, 250, 270, and 300° C., the thermosetting resin, a binder, was decomposed and dissolved or dispersed in the material mixture and the laminate left only the glass fiber fabric, which was a base material, and the copper foil. The glass fiber fabric was in the state where it could easily be separated into the sheets in the same number as that of the sheets laminated in the laminate fabrication process. The gas discharged out of the container by nitrogen gas generated white smoke. The bromine recovered by an aqueous sodium hydroxide solution was measured by ion chromatography to find that the recovery was 70% or more of bromine contained in the laminate, the halogen-containing flame-retardant resin composition at 200° C. or higher. On the other hand, in the case of treatment at 190° C., only 2% recovery ratio of bromine was achieved. It is made clear that the resin cross-linking chains are decomposed by the dehalogenation promoting material so as to disintegrate the resin and promote the dehalogenation reaction. The analysis of the products dissolved or dispersed in the material mixture made it clear that the products had the similar structure to that of the epoxy resin main chains and that the molecular weights had a broader distribution than those before hardening. Further, they had functional groups such as hydroxy groups and could be hardened by a similar hardening agent to that used for the present embodiment. The products recovered in such a manner are reusable as raw materials for resin.

Meanwhile, also in the case of treatment at 330° C., the gas discharged out of the container by nitrogen gas generated white smoke. The bromine recovered by an aqueous sodium hydroxide solution was measured by ion chromatography to find that the recovery was 70% of bromine contained in the laminate. However, a large quantity of gases were generated besides and thermal decomposition was found to take place. Tar and oils were found adhering to the inside of the container after the reaction and the glass fiber fabric and the copper foil were considerably stained and emitted malodor. As described above, bromine can be eliminated even by the treatment at a high temperature exceeding 300° C., but the resin is thermally decomposed and cannot be reused and also the coexisting glass fibers and copper foil cannot be recovered and reused.

Next, also in the case where the pressure was decreased by gas evacuation by a vacuum pump and then treatment at 270° C. was carried out, the laminate similarly left only the glass fiber fabric, which was the base material, and the copper foil. However, the material mixture bore dark brown color in case of carrying out no gas evacuation pretreatment, whereas the material mixture bore only light brown color. The brown color is derived from bromine, which also shows that bromine in the non-combustible epoxy resin is eliminated. Further, the dark brown color of the material mixture in the case where no gas evacuation pretreatment was carried out shows deterioration of the material mixture and supposedly attributed to the oxidation by oxygen existing in the container. One which shows the similar tendency is a copper foil recovered after separation and the extent of the oxidation deterioration was clearly less if vacuum degassing was carried out. Further, also regarding the glass fiber fabric, the stain is slight and cleaning is easy corresponding to the slightness of the deterioration of the material mixture if the vacuum degassing was carried out. As described above, if the treatment is carried out at a temperature higher than the thermal decomposition temperature of the resin, halogens can be eliminated, however the resin or the fillers cannot be reused.

Further, bromine trapped by sodium hydroxide was more recovered and the recovery ratio was 85% if the vacuum gas evacuation treatment was carried out. This is because owing to oxygen removal by the vacuum evacuation, amount of the dehalogenation promoting material to be reacted with oxygen was decreased and thus the dehalogenation promoting material were more involved in the bromine elimination reaction.

Also in the case where a laminate was brought into contact with the vapor phase of material mixture, the thermosetting resin, which was a binder, was decomposed and dissolved or dispersed in the decomposed material and the laminate it was found for the laminate that glass fiber fabric, which was a base material, and the copper foil were peeled and the a slight amount of resin remained without being decomposed. Although the same treatment can be carried out by vapor phase of the material mixture, it takes slightly long time to carry out the treatment. The gas discharge out of the container by nitrogen gas generated white smoke.

In this case, although bromine trapped by sodium hydroxide was slightly less than that by the immersion treatment including the liquid phase, the recovery ratio was 65%. Without decreasing the bromine recovery ratio so much in the vapor phase, the material mixture to be used can be decreased.

As described above, the laminate, which is a flame-retardant resin composition containing epoxy resin, thermosetting resin, as a binder is immersed in the material mixture containing tetralin and sodium hypophosphite and heated to 200° C. or higher to be quickly decomposed and to efficiently eliminate bromine for flame-retardation and make the resulting resin reusable as a raw material as well.

Further, by decreasing the pressure by gas evacuation, deterioration of the decomposition solution and generation of decomposition gases can be suppressed and bromine for flame-retardation can be highly efficiently eliminated. Further, oxidation of copper to be recovered after the thermosetting resin separation and deterioration of the base material of glass fabric can be suppressed to recover metals or the like with higher grade.

Further, even in the case where the laminate is brought into contact with only the vapor phase of the material mixture, the thermosetting resin, a binder, can be decomposed and bromine for flame-retardation can be still efficiently eliminated though the efficiency is slightly decreased as compared with that in the immersion condition including the liquid phase and the amount of the material to be used can be decreased.

Consequently, the present treatment method is capable of easily decomposing the halogen-containing flame-retardant resin composition and isolating and recovering contained bromine at a high efficiency. Further, the treatment method is capable of easily isolating and recovering metals such as copper foil and a base material of glass fabric with high grade while scarcely deteriorating the decomposition solution to be used.

Incidentally, the reduced pressure is preferably close to vacuum as much as possible and preferably it is 10 mmHg or lower.

Also, the temperature at the time of decomposition treatment is, of course, not restricted to the values of the present embodiment and may be within a range from 200° C. or higher to the thermal decomposition temperature or lower.

Incidentally, the composition and constitution of the laminate containing epoxy resin as a binder are neither restricted to the values of the present embodiment. The types of the epoxy resin and the flame-retardant are also not restricted and the flame-retardant may be an addition type.

Further, the constitution and the production method of the resin hardened product are also not restricted to those of the present embodiment and for example, other than the defined form in the present embodiment, the base material may be in the forms of non-woven fabrics of glass fibers, woven or non-woven fabrics of polyester fibers, woven or non-woven fabrics of nylon fibers, woven or non-woven fabrics of acrylic fibers, woven or non-woven fabrics of aramide fibers, linter paper, mica paper, cotton cloth, asbestos and the like.

In such cases, the base material of polyesters, nylon, acrylic resin can be decomposed just like the epoxy resin.

Further, the non-combustible thermosetting resin composition may be a printed circuit substrate produced from the copper-clad laminate by steps of printing a circuit and etching. In such a case, the resist can be decomposed in the same manner.

Incidentally, in the present embodiment, the laminate using epoxy resin as a binder was employed as an example, however the present invention is not restricted to the example but maybe applicable to molded products with other shapes, coating materials, putty, and adhesives.

Further, although tetralin and sodium hypophosphite were exemplified as the material mixture in the present embodiment, the composition and the mixing ratios are not restricted to the above example and may be any material mixture containing the dehalogenation promoting material containing at least one compound selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone and at least one dehalogenation material selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide.

Further, in place of the pressure decrease, degassing treatment by replacement with nitrogen may be applicable and pressure decrease and gas discharge may be carried out after the replacement with nitrogen to carry out treatment accompanied with less oxidation deterioration.

Further, both of the liquid-phase immersion and the vapor-phase immersion are described in the present embodiment and either one is possible and also possible is treatment by contacting with both phases in the state where vapor phase and liquid phase exist together. That is, the non-combustible thermosetting resin composition is immersed in the material mixture in liquid state at a room temperature and put in closed state and then the material mixture is kept in vapor-liquid equilibrium state by heating and the non-combustible thermosetting resin composition may be put in the state of being brought into contact with both phases.

Further, those to collect the gases generated by the treatment are not restricted to the aqueous sodium hydroxide solution of the present embodiment but are alkaline substances such as alkali metal oxides, alkali metal hydroxides such as sodium hydroxide and potassium hydroxide, alkali metal alkoxides such as sodium ethoxide, alkaline earth metal oxides such as calcium oxide, alkaline earth metal hydroxides such as calcium hydroxide, alkaline earth metal alkoxides and amines and also, as a solvent, usable are alcohols, glycols, ethers other than water. The alkaline substances such as amines may solely be used as alkaline solutions. Further, a suction pipe filled with a solid alkaline substance may be installed and the generated gases may be passed through the pipe. Further, it is preferable to collect gases by making the alkaline solution for the collection ready by fully filling a plurality of containers with the solution and passing the gases through the solution a plurality of times.

(Embodiment 2)

An embodiment of dehalogenation treatment method of the present invention for a halogen-containing flame-retardant resin composition will be described below.

EXPERIMENTAL EXAMPLE 1

The treatment method of the present invention will be described in the present embodiment while using an example, a television cabinet which is a molded product of a halogen-containing flame-retardant resin composition containing polystyrene as a base and a flame-retardant.

A polystyrene resin containing tetrabromobisphenol A as a flame-retardant was molded to obtain a television cabinet.

Then, the cabinet is brought into contact with a material mixture containing dehalogenation promoting materials containing one or more of compounds selected from the group consisting of methyl chloride, dichloromethane, chloroform, carbon tetrachloride, bromoform, methanol, ethanol, 1-propanol, 2-propanol, 1-butanol, 2-butanol, isobutylalcohol, tert-butylalcohol, phenol, cresol, ethylene glycol, propylene glycol, diethylene glycol, dipropylene glycol, isoprene glycol, triethylene glycol, tetraethylene glycol, diethyl ether, dioxane, tetrahydrofuran, acetone, methyl ethyl ketone, 2-hexanone, 2-methyl-4-pentanone, phorone, isophorone, 2-heptanone, 4-heptanone, diisobutyl ketone, acetonylacetone, cyclohexanone, methylcyclohexanone, acetophenone, acetic acid, acetonitrile, diethylamine, triethylamine, N,N-dimethylformamide, N-methylpyrrolidone, dimethyl sulfoxide, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, polyethylene glycol, polypropylene glycol, and tetralin and at least one dehalogenation material selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide, to carry out the treatment. In the present embodiment, the material mixture was produced by selecting polyethylene glycol with the average molecular weight of 300 from the dehalogenation promoting materials and zinc from the dehalogenation materials.

In the present example, the material mixture and the polystyrene resin, the halogen-containing flame-retardant resin composition, are brought into contact with each other by a biaxial kneading extruder.

The cabinet molded product for a television is pulverized to fragments with 200 μm square size and roughly mixed with the foregoing material mixture and then the resulting mixture is loaded to a biaxial kneading extruder from a hopper. The temperature was 200° C. The resin and the material mixture are heated and extruded while being brought into contact with each other by the shear force applied by two screws in the biaxial kneading extruder. Incidentally, bents are formed at two points in the biaxial kneading extruder and gases discharged out of the respective bent ports are to be passed through an aqueous sodium hydroxide solution in two steps and then discharged outside the system. The treatment was continuously carried out at 100 kg/h speed. The liquefied and softened resin component is discharged out of dies at the tip and cooled by water flow and the resulting hardened resin component was pelletized by a pelletizer. At that time, the liquid component was dissolved in water and the solute dissolved in the liquid component was recrystallized and precipitated in the water.

Analysis of the respective components made it clear that the pelletized resin was polystyrene and the molecular weight measured by gel permeation chromatography was not changed from that before the treatment.

Further, the liquid components dissolved in the water were found to be polyethylene glycol and no molecular weight decrease was either observed.

Further, the analysis of the precipitates formed in the water by recrystallization and precipitation made it clear that they were bisphenol A and bromo-substituted bisphenol A. Also, the components recovered by the aqueous sodium hydroxide solution were analyzed by ion chromatography to find that they were bromine contained in the molded product of the halogen-containing flame-retardant resin composition and that 95% of bromine contained in the initial stage was recovered.

As described above, the flame-retardant in polystyrene containing a flame-retardant resin composition as the flame-retardant was dissolved in polyethylene glycol, a dehalogenation promoting material, to produce an even reaction system and reaction was promoted by zinc, a dehalogenation material, so that bromine contained in polystyrene for flame-retardation could be recovered at a high recovery ratio.

Further, the flame-retardant was recovered and separated in form of bisphenol A, it can be used as a raw material for epoxy resin or the like.

Further, since polystyrene was also recovered with no molecular weight decrease at all, the recovered polystyrene can be reused as a resin material.

EXPERIMENTAL EXAMPLE 2

An experiment was carried out in the thoroughly same manner as the Experimental Example 1, except that the set temperature of the biaxial kneading extruder was 300° C.

As a result, a large quantity of decomposition gases were generated through the bent ports and the dies and loading with the material from the hopper was gradually made difficult owing to the inverse flow attributed to the gases. The gases were found to be derived from polystyrene and polyethylene glycol and both were found to be thermally decomposed at 300° C. For that, a large quantity of gases were evolved and at the same time, the molecular weight of polystyrene discharged out of the dies was decreased and the molecular weight of polyethylene glycol dissolved in water was also decreased. Although bromine was detected from the aqueous sodium hydroxide solution connected to the bent ports, the ratio was about 25% in the initial content in the resin. It was found that although the effect of the bromine elimination was observed, polyethylene glycol, the dehalogenation promoting material, was also thermally decomposed to result in an insufficient reaction promoting effect. Further, since the molecular weight of the recovered polystyrene was considerably decreased, the physical properties were not satisfactory in the case where the recovered polystyrene was reused as it was.

As described above, the temperature for contacting with the material mixture is preferably the temperature lower than the thermal decomposition temperature of the resin. Of course the temperature is not at all restricted to those value defined in the present embodiment and in the case of polystyrene, it may be within a range lower than 300° C.

Incidentally, the composition and the constitution of the resin containing polystyrene as a base material are not restricted to those value defined in the present embodiment. In order to heighten the impact resistance, grafting may be carried out with polybutadiene and in order to heighten the strength, glass fiber may be used for filling. Other than that, the resin may be filled or mixed with coloring agents, release agents, and flame-retardant assisting agents.

Further the types of the flame-retardants are not particularly restricted and may be one or a mixture of a plurality of substances selected from the group consisting of decabromodiphenyl ether, tetrabromobisphenol A, 2,2-bis(4-hydroxy-3,5-dibromophenyl)propane, hexabromobenzene, tris(2,3-dibromopropyl)isocyanurate, 2,2-bis(4-hydroxyethoxy-3,5-dibromophenyl)propane, perfluorocyclodecanethylenebis(pentabromobenzene), ethylene bistetrabromophthalimide, hexabromocyclododecane, a halogen-containing polyphosphate, paraffin chloride, pentabromotoluene, octabromodiphenyl oxide, tetrabromophthalic anhydride, brominated (alkyl)phenol, tris (tribromophenoxy)triazine, brominated polystyrene, octabromotrimethylphenylindane, pentabromobenzyl acrylate, polydibromophenylene oxide, bis (tribromophenoxyethane), tetrabromobisphenol A-epoxy oligomer/polymer, tetrabromobisphenol A-carbonate oligomer, tetrabromobisphenol A-bis(2,3-dibromopropyl ether), tetrabromobisphenol A-bis(allyl ether), and tetrabromobisphenol S.

Incidentally, in the present embodiment, although the description was given using a cabinet for a television made of polystyrene as a base as an example, the present invention is not restricted to that and applicable to other molded products with other shapes.

Further, although polyethylene glycol was used as an example of the dehalogenation promoting material in the present embodiment, the composition and the mixing ratio are not restricted to those exemplified above and usable are one or a mixture of a plurality of compounds selected from the group consisting of methyl chloride, dichloromethane, chloroform, carbon tetrachloride, bromoform, methanol, ethanol, 1-propanol, 2-propanol, 1-butanol, 2-butanol, isobutylalcohol, tert-butylalcohol, phenol, cresol, ethylene glycol, propylene glycol, diethylene glycol, dipropylene glycol, isoprene glycol, triethylene glycol, tetraethylene glycol, diethyl ether, dioxane, tetrahydrofuran, acetone, methyl ethyl ketone, 2-hexanone, 2-methyl-4-pentanone, phorone, isophorone, 2-heptanone, 4-heptanone, diisobutyl ketone, acetonylacetone, cyclohexanone, methylcyclohexanone, acetophenone, acetic acid, acetonitrile, diethylamine, triethylamine, N,N-dimethylformamide, N-methylpyrrolidone, dimethyl sulfoxide, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, polyethylene glycol, polypropylene glycol, and tetralin.

Also, regarding the dehalogenation material, it is not restricted to zinc as used in the present embodiment and at least one substance may be selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide to produce the material mixture.

Further, the liquid phase of polyethylene glycol was exemplified in the present example, the vapor-phase state produced by selecting other dehalogenation promoting materials and heating them may be employed for the treatment. Alternatively, both states may be employed and also treatment may be carried out by contacting with both phases in the state where the vapor and liquid phases coexist.

Further, to collect the gases evolved by the treatment, usable are not only an aqueous sodium hydroxide solution as it is used in the present embodiment but also alkaline substances including alkali metal oxides, alkali metal hydroxides such as sodium hydroxide and potassium hydroxide, alkali metal alkoxides such as sodium ethoxide, alkaline earth metal oxides such as calcium oxide, alkaline earth metal hydroxides such as calcium hydroxide, alkaline earth metal alkoxides and amines and also as a solvent, usable are alcohols, glycols, ethers other than water. The alkaline substances such as amines may solely be used as alkaline solutions. Further, a suction pipe filled with a solid alkaline substance may be installed and the generated gases may be passed through the pipe. Further, it is preferable to collect gases by making the alkaline solution for the collection ready by fully filling a plurality of containers with the solution and passing the gases through the alkaline solution a plurality of times.

Further, although an example using the biaxial kneading extruder was described in the present example, the design of the apparatus is neither restricted to the present example. For example, a solvent barrel having a screen or the like may be installed to discharge the liquid components before they are discharged by the dies. Also, a vacuum pump may be connected to a vent port to discharge gas components in decreased pressure.

Further, contact of the flame-retardant resin composition with the material mixture may be carried out while applying shear force not only using restrictedly the biaxial kneading extruder but also a monoaxial extruder and kneader, rotation rolls of two rolls or three rolls, and the like. Alternatively, batch treatment in a reaction steel in such as a stainless steel tank may also be applicable.

(Embodiment 3)

An embodiment of dehalogenation treatment method of the present invention for a halogen-containing flame-retardant resin composition will be described below. In the present embodiment, given is a description of a treatment method of the present invention using a printed circuit board as an example, which is a halogen-containing flame-retardant resin composition using phenol resin as a binder.

After Kraft paper was impregnated with phenol resin varnish containing a decabromodiphenyl ether flame-retardant, the resulting paper was heated to evaporate the solvent to produce a prepreg. The prepreg was cut and laminated and inserted into a press to harden the phenol resin by heating and applying pressure and obtain a layered board.

Further, the resulting copper-clad laminate was subjected to circuit printing and etching steps to form a conductor pattern and electronic parts were incorporated with the laminate to obtain a printed circuit board.

Then, the laminate is immersed in a material mixture containing at least one decomposition material selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone and at least one dehalogenation material selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide, to carry out the treatment. In the present embodiment, the material mixture was produced by selecting tetralin from the dehalogenation promoting materials and sodium ethoxide, a metal alkoxide, from the dehalogenation materials.

The printed circuit board was immersed in the material mixture and after the reaction container was evacuated by a vacuum pump to decrease the pressure, the circuit board was immersed at 270° C. for five hours.

On completion of the reaction, the reaction system was gradually cooled to 100° C. and then while the temperature being kept at 100° C., nitrogen gas was blown and gases discharged through an opened nozzle was passed through an aqueous sodium hydroxide solution and then discharged.

As a result, the resin as a binder was decomposed and dissolved or dispersed in tetralin and the Kraft paper, a base material, was also partially decomposed and deformed to be in carbonized state and some of the laminated layers were separated. The copper foil and the electronic parts were separated from the laminate or partially drawn out and eliminated in the decomposition solution due to additional force caused by the deformation. Further, thermoplastic resin such as poly(butylene terephthalate) composing the electronic parts was drawn to the solution. The gases discharged out of the container by nitrogen gas generated white smoke. Bromine recovered by the aqueous sodium hydroxide solution was measured by ion chromatography to find that 80% of bromine was recovered from the laminate, which was the halogen-containing flame-retardant resin composition.

As described above, in the printed circuit board, which was a resin hardened product containing phenol resin, thermosetting resin, as a binder, the resin components or the base material could quickly be decomposed by tetralin and bromine contained in the printed circuit board for flame-retardation could efficiently be recovered.

Further, the copper foil and the electronic parts could be eliminated and recovered. The method is capable of recovering valuable substances and decreasing the volume of the printed circuit board and the phenol substrate is a suitable object. Further, by the present invention, metals with high grade can be efficiently recovered and the gas evolution amount is low and the pressure is not so much increased, so that the decomposition tank is not required to have a high pressure resistance and the decomposition products can be recovered as solid components and solutions. The produced products were analyzed to find that the cross-linking chains of phenol resin were cut and they existed with molecular weights of approximately those of oligomers. They can be reused as resin raw materials by using together with a hardening agent such as formaldehyde.

Incidentally, the extent of the reduced pressure is preferably close to vacuum as much as possible and preferably it is 10 mmHg or lower.

Also, the temperature at the time of decomposition treatment is, of course, not restricted to the values of the present embodiment and may be within a range from 200° C. or higher to a temperature lower than the thermal decomposition temperature.

Also, the composition and the constitution of the laminate using phenol resin as a binder are not at all restricted to those value in the present embodiment. The phenol resin may be resol type or novolak type.

Further, the types of the flame-retardants are also not restricted and reaction type flame-retardants containing phenolic aromatic rings containing bromine as a substituent are also usable.

The constitution and the production method of the flame-retardant resin composition is not restricted to those in the present embodiment and for example, other than the base material in the state of the present embodiment, the base material may be of non-woven fabric of glass fibers, a woven or non-woven fabric of polyester fibers, a woven or non-woven fabric of nylon fibers, a woven or non-woven fabric of acrylic fibers, a woven or non-woven fabric of aramide fibers, linter paper, mica paper, cotton cloth, asbestos, and the like. In this case, the base material made of polyester, nylon, and an acrylic polymer can be decomposed in the same manner as the epoxy resin.

Further, the non-combustible thermosetting resin composition may be a printed circuit substrate produced from a copper-clad laminate by circuit printing and etching steps. In such a case, the resist can be decomposed in the same manner.

Incidentally, in the present embodiment, although the laminate using phenol resin as a binder was exemplified, the flame-retardant resin composition is not restricted to that but may be molded products with other shapes, coating materials, putty, and adhesives.

Further, in the present embodiment, although tetralin was exemplified as the dehalogenation promoting material, the composition and the mixing ratio are not restricted to those described above and as the dehalogenation promoting materials, at least one compound may be selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone. Also, regarding the dehalogenation material, it is not resticted to sodium ethoxide, a metal alkoxide, in the present embodiment and one or more of dehalogenation materials may be selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide to produce a material mixture.

Also, in place of pressure decrease, degassing treatment by replacement with nitrogen can be employed and vacuum evacuation after replacement with nitrogen may be carried out to carry out treatment with less oxidation deterioration.

Further, although immersion in both of the liquid phase and the vapor phase was exemplified in the present invention, either one may be valid and also valid is treatment involving contact with both phases in the state where vapor phase and liquid phase exist together. That is, a flame-retardant resin composition may be immersed in a liquid state material mixture at a room temperature and closed and then the material mixture may be maintained in vapor liquid equilibrium by heating to bring the flame-retardant resin composition into contact with both phases.

Further, it is not restricted to an aqueous sodium hydroxide solution of the present embodiment to collect gases evolved by the treatment, usable are alkaline solutions containing as alkaline substances of alkali metal oxides, alkali metal hydroxides such as sodium hydroxide and potassium hydroxide, alkali metal alkoxides such as sodium ethoxide, alkaline earth metal oxides such as calcium oxide, alkaline earth metal hydroxides such as calcium hydroxide, alkaline earth metal alkoxides and amines and also, as a solvent, alcohols, glycols, ethers other than water. The alkaline substances such as amines may solely be used as alkaline solutions. Further, a suction pipe filled with a solid alkaline substance may be installed and the generated gases may be passed through the pipe. Further, it is preferable to collect gases by making the alkaline solution for the collection ready by fully filling a plurality of containers with the solution and passing the gases through the solution a plurality of times.

(Embodiment 4)

An embodiment of a treatment method of the present invention for a halogen-containing flame-retardant resin composition will be described below.

An unsaturated polyester resin was obtained by mixing 65 parts by weight of phthalic anhydride, tetrahydrophthalic anhydride, fumaric anhydride, propylene glycol and dibromoneopentyl glycol with 35 parts by weight of styrene and further adding 0.01 part by weight of a polymerization inhibitor methoxyhydroquinone to the mixture and stirring and dissolving the resulting mixture at a room temperature.

A low shrinkage agent was obtained by stirring and dissolving 36 parts by weight of polydipropylene adipate in 64 parts by weight of 2-hydroxyethyl methacrylate.

A resin solution composition was obtained by stirring and mixing 74 parts by weight of the above described unsaturated polyester resin, 26 parts by weight of the low shrinkage agent, and 1 part by weight of 1,1-(t-butylperoxy)3,3,5-trimethylcyclohexane, a polymerization initiator, together.

Then, 17.8 parts by weight of calcium carbonate, a filler, 48.5 parts by weight of aluminum hydroxide, 1.5 parts by weight of zinc stearate, a release agent, and 0.4 part by weight of a carbon powder, a coloring agent, were transferred to a kneader and dry mixed. After about five minutes, 22 parts by weight of the previously mixed resin solution composition was gradually added to the evenly mixed dry mixture and kneaded to obtain a uniform paste-like mixture.

Further, 9.8 parts by weight of glass fibers was evenly dispersed in the paste-like mixture within a time as short as possible and the kneading was carried out until the glass fibers were wetted and evenly dispersed to produce a thermosetting resin hardened material.

Next, an electromagnetic layered steel plate on which electromagnetic windings were formed was supplied to dies and the resin hardened material was injection molded at a molding temperature of 150° C. to obtain a molded motor, which was a halogen-containing non-combustible thermosetting resin composition. In this composition, the halogen is bromine and exists in the reaction type skeleton structure of the unsaturated polyester resin, which is a thermosetting resin.

Incidentally, the thickness of the molded parts in the molded motor is 10 mm at the maximum.

Next, the molded motor was immersed in a material mixture containing propylene glycol and sodium ethoxide, a metal alkoxide, and loaded to a reaction container. After that, nitrogen gas was sent to a reaction container through a nozzle from a nitrogen gas bomb and the gas in the container was replaced with nitrogen gas. After that, the reaction system was heated to 280° C. and kept for five hours.

On completion of the reaction, after releasing heat and cooling to 100° C., while the temperature being kept at 100° C., nitrogen gas was blown and the gas discharged through an opened nozzle was passed through an aqueous sodium hydroxide solution and then discharged. The gas discharged out of the container by nitrogen gas generated white smoke.

After being gradually cooled to a room temperature, the resulting molded motor was taken out of the container to find that the resin hardened parts of the molded motor were disintegrated and swollen in gel state and therefore they could easily be separated. That is, the electromagnetic windings and the electromagnetic parts of the electromagnetic layered steel plate could be easily separated and recovered from the molded motor. The separated resin components were analyzed after washing and drying to find that they were carboxylic acids or glycols having partially remaining cross-linking structure. Consequently, they can be reused as raw materials for polyesters.

Further, bromine recovered by the aqueous sodium hydroxide solution was measured by ion chromatography to find that bromine was recovered at 70% ratio.

As described in the present embodiment, bromine can be eliminated from a bromine-containing molded structure body by the material mixture containing propylene glycol and a metal alkoxide and at the same time, the hardness of the resin hardened parts in the molded motor, which is a resin composition containing unsaturated polyester resin as a binder, is considerably decreased to make the hardened parts easy to separate even by hands and metals with high grade such as copper and iron can be recovered.

Consequently, the present treatment is a treatment method capable of isolating halogens and at the same time easily peeling and isolating resin hardened products and easily separating and recovering valuable metals with high grade such as copper, iron and the like of electromagnetic members of the electromagnetic windings and the electromagnetic layered steel plates. Further, the molded motor is also one of preferable examples of those which are detoxicated by halogen elimination by the treatment method, of the present invention and from which valuable metals are easily recovered.

Incidentally, in the present embodiment, although the molded motor was treated as an object to be decomposed as it was, treatment may be carried out after pretreatment by coarse pulverization and cutting. In such a manner, the thickness of the resin hardened parts from the outer surface can be made thin and the time to immerse the resin composition in the material mixture can be shortened.

Further, if cracks are formed in the molded motor, cracking faces form new outer surfaces and the thickness of the resin hardened parts from the outer surface is made thin, so that it is sufficient to cause only damages by a chisel or the like.

Further, the composition of the thermosetting resin composition is of course not at all restricted to the mixing ratio of the present embodiment and the halogens contained in the composition are not restricted to those in the present embodiment either and they may be of addition type as well.

The constitution and the production method of the thermosetting resin composition are not restricted to the present embodiment and may be mixed with, for example, fillers such as calcium carbonate, calcium silicate, barium sulfate, aluminum hydroxide, talc, mica and the like, reinforcing agents such as glass fibers, carbon fibers, and the like, and other than these additives, further with thickeners, release agents, and coloring agents.

Further, in the present embodiment, although description is given while exemplifying the bulk type molded material, the treatment method is applicable to sheet-like SMC (sheet molding compound) and granular PMC (pelletized type molding compound).

Incidentally, although the material mixture containing propylene glycol as a dehalogenation promoting material and sodium ethoxide as a dehalogenation material was exemplified for the present embodiment, it may be a material mixture containing one or more of dehalogenation promoting materials selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone and at least one dehalogenation material selected from the group consisting of tetralin, sodium hypophosphite, sodium thiosulfate, ascorbic acid, hydrazine, dimide, formic acid, an aldehyde, a saccharide, hydrogen sulfide, lithium, calcium, magnesium, zinc, iron, titanium, aluminum lithium hydride, lithium hydride, hydrogenated diisobutylaluminum, alcoholic potassium, a metal alkoxide, an amine, and potassium iodide.

Further, in place of replacement with nitrogen, gas discharge treatment by pressure decrease can be employed and also after replacement with nitrogen, vacuum evacuation may be carried out to carry out the treatment accompanied with less deterioration.

Further, although the immersion in the liquid phase was exemplified in the present invention, both of the liquid-phase immersion and the vapor-phase immersion may be valid and also valid is treatment by contacting with both phases in the state where vapor phase and liquid phase exist together. That is, the non-combustible thermosetting resin composition is immersed in the material mixture in liquid state at a room temperature and put in closed state and then the material mixture is kept in vapor-liquid equilibrium state by heating and the non-combustible thermosetting resin composition may be put in the state of being brought into contact with both phases.

Further, those to collect the gases generated by the treatment are not restricted to the aqueous sodium hydroxide solution of the present embodiment but are alkaline substances such as alkali metal oxides, alkali metal hydroxides such as sodium hydroxide and potassium hydroxide, alkali metal alkoxides such as sodium ethoxide, alkaline earth metal oxides such as calcium oxide, alkaline earth metal hydroxides such as calcium hydroxide, alkaline earth metal alkoxides and amines and also, as a solvent, usable are alcohols, glycols, ethers other than water. The alkaline substances such as amines may solely be used as alkaline solutions. Further, a suction pipe filled with a solid alkaline substance may be installed and the generated gases may be passed through the pipe. Further, it is preferable to collect gases by making the alkaline solution for the collection ready by fully filling a plurality of containers with the solution and passing the gases through the solution a plurality of times.

Incidentally, the temperature in the treatment is of course not restricted to the value of the present embodiment. It may be lower than the thermal decomposition temperature of the resin.

Further, after decomposition treatment of the molded motor, the resin hardened parts may be peeled and separated by hands while putting chemical resistant globes on the hands or may be done by a spatula or a pressing type jig. Further, elimination and separation may of course be done by spraying high pressure water.

As described above, by employing the dehalogenation treatment method of the present invention for a halogen-containing flame-retardant resin composition, halogens can be separated and recovered and the halogen-containing flame-retardant resin composition can be detoxicated without emitting harmful substance such as halogenated dioxins and halogenated dibenzofurans and at the same time, fillers contained in the resin and the composition can be recovered and made reusable.

What is claimed is:

1. A dehalogenation treatment method of a halogen-containing flame-retardant resin composition comprising a step of bringing the halogen-containing non-combustible thermosetting resin composition into contact with a material mixture containing a dehalogenation promoting material capable of decomposing some of chemical bonds of the thermosetting resin and producing resin raw materials and a dehalogenation material at 200° C. or higher and a temperature lower than a thermal decomposition temperature of the thermosetting resin composition.

2. The dehalogenation treatment method of halogen-containing flame-retardant resin composition as set forth in claim 1, wherein the dehalogenation promoting material is at least one substance selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, tetralin, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone.

3. The dehalogenation treatment method of a halogen-containing flame-retardant resin composition as set forth in claim 1 or claim 2, wherein the halogen-containing flame-retardant resin composition is a printed circuit board comprising a resin layered laminate produced by laminating and molding prepregs each composed of at least a base material selected at least from the group consisting of a woven or non-woven fabric of glass fibers, a woven or non-woven fabric of polyester fibers, a woven or non-woven fabric of nylon fibers, a woven or non-woven fabric of acrylic fibers, a woven or non-woven fabric of aramide fibers, paper, mica paper, cotton cloth, and asbestos and epoxy or phenol resin with which the base material is impregnated; a conductor pattern formed on the base material; and electronic parts incorporated into the base material.

4. The dehalogenation treatment method of a halogen-containing flame-retardant resin composition as set forth in claim 1, wherein the dehalogenation promoting material is at least one substance selected from the group consisting of ethylene glycol, propylene glycol, diethylene glycol, dipropylene glycol, isoprene glycol, triethylene glycol, tetraethylene glycol, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether and tripropylene glycol monomethyl ether, biphenyl, naphthalene, 1,4-hydroxynaphthalene, naphthol, 1,4-naphthoquinone, pitch, creosote oil, methyl isobutyl ketone, isophorone, 2-hexanone, 2-heptanone, 4-heptanone, diisobutyl ketone, acetonylacetone, phorone, cyclohexanone, methylcyclohexanone, and acetophenone.

5. The dehalogenation treatment method of a halogen-containing flame-retardant resin composition as set forth claim 4, wherein the dehalogenation material is at least one substance selected from the group consisting of sodium hypophosphite, sodium thiosulfate, ascorbic acid, hydrazine, dimide, formic acid, aldehydes, saccharides, hydrogen sulfide, lithium, calcium, magnesium, zinc, iron, titanium, aluminum lithium hydride, lithium hydride, hydrogenated diisobutylaluminum, alcoholic potassium, metal alkoxides, amines, and potassium iodide.

6. A dehalogenation treatment method of a halogen-containing flame-retardant resin composition comprising a step of bringing the halogen-containing non-combustible thermoplastic resin composition into contact with a material mixture containing a dehalogenation promoting material capable of dissolving at least a halogen-containing flame-retardant and a dehalogenation material at a temperature lower than a thermal decomposition temperature of the thermoplastic resin composition.

7. The dehalogenation treatment method of a halogen-containing flame-retardant resin composition as set forth in claim 6, wherein the dehalogenation promoting material is at least one compound selected from the group consisting of methyl chloride, dichloromethane, chloroform, carbon tetrachloride, bromoform, methanol, ethanol, 1-propanol, 2-propanol, 1-butanol, 2-butanol, isobutylalcohol, tert-butylalcohol, phenol, cresol, ethylene glycol, propylene glycol, diethylene glycol, dipropylene glycol, isoprene glycol, triethylene glycol, tetraethylene glycol, diethyl ether, dioxane, tetrahydrofuran, acetone, methyl ethyl ketone, 2-hexanone, 2-methyl-4-pentanone, phorone, isophorone, 2-heptanone, 4-heptanone, diisobutyl ketone, acetonylacetone, cyclohexanone, methylcyclohexanone, acetophenone, acetic acid, acetonitrile, diethylamine, triethylamine, N,N-dimethylformamide, N-methylpyrrolidone, dimethyl sulfoxide, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, polyethylene glycol, polypropylene glycol, and tetralin.

8. The dehalogenation treatment method of a halogen-containing flame-retardant resin composition as set forth in claim 6 or claim 7, wherein the halogen-containing flame-retardant resin composition is a box body of a television, a display, or a personal computer and the method comprises a step of pulverizing the box body prior to the contact with the material mixture containing the dehalogenation material and the dehalogenation promoting material.

9. The dehalogenation treatment method of a halogen-containing flame-retardant resin composition as set forth in claim 6, wherein the dehalogenation promoting material is at least one compound selected from the group consisting of methyl chloride, dichloromethane, chloroform, carbon tetrachloride, bromoform, methanol, ethanol, 1-propanol, 2-propanol, 1-butanol, 2-butanol, isobutylalcohol, tert-butylalcohol, phenol, cresol, ethylene glycol, propylene glycol, diethylene glycol, dipropylene glycol, isoprene glycol, triethylene glycol, tetraethylene glycol, diethyl ether, dioxane, tetrahydrofuran, acetone, methyl ethyl ketone, 2-hexanone, 2-methyl-4-pentanone, phorone, isophorone, 2-heptanone, 4-heptanone, diisobutyl ketone, acetonylacetone, cyclohexanone, methylcyclohexanone, acetophenone, acetic acid, acetonitrile, diethylamine, triethylamine, N,N-dimethylformamide, N-methylpyrrolidone, dimethyl sulfoxide, 2-methoxyethanol, 2-ethoxyethanol, 2-dimethoxyethanol, 2-isopropoxyethanol, 2-butoxyethanol, 2-isopentyloxyethanol, 2-hexyloxyethanol, 2-phenoxyethanol, 2-benzyloxyethanol, 1-methoxy-2-propanol, 1-ethoxy-2-propanol, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, tripropylene glycol monomethyl ether, polyethylene glycol, and polypropylene glycol.

10. The dehalogenation treatment method of a halogen-containing flame-retardant resin composition as set forth in claim 9, wherein the dehalogenation material is at least one substance selected from the group consisting of sodium hypophosphite, sodium thiosulfate, ascorbic acid, hydrazine, dimide, formic acid, aldehydes, saccharides, hydrogen sulfide, lithium, calcium, magnesium, zinc, iron, titanium, aluminum lithium hydride, lithium hydride, hydrogenated diisobutylaluminum, alcoholic potassium, metal alkoxides,-amines, and potassium iodide.

11. The dehalogenation treatment method of a halogen-containing flame-retardant resin composition as set forth in any one of claims 1 to 7, wherein the halogen-containing flame-retardant resin composition is a composite so composed as to cover a metal wire and brought into contact with the material mixture containing the dehalogenation material and the dehalogenation promoting material to seperate the metal.

12. A dehalogenation treatment method of a halogen-containing flame-retardant resin composition comprising a step of bringing the halogen-containing flame-retardant resin composition into contact with a material mixture containing a dehalogenation material and a dehalogenation promoting material at a temperature lower than the thermal decomposition temperature of the resin composition, by kneading the mixture while applying shear force, wherein the contact by kneading while applying shear force is carried out by a biaxial kneading extruder, a kneader, or rotation rolls.

13. The dehalogenation treatment method of a halogen-containing flame-retardant resin composition as set forth in claim 12, wherein the step of bringing the halogen-containing flame-retardant resin composition into contact with the material mixture containing the dehalogenation material and the dehalogenation promoting material is carried out at 200° C. or higher.

14. The dehalogenation treatment method of a halogen-containing flame-retardant resin composition as set forth in any one of claims 6 to 12, and 9 wherein the resin is polystyrene.

15. A method for treating a halogen-containing flame-retardant resin composition, in which the flame-retardant resin composition comprises styrene and a halogen-containing flame retardant;

the method comprising:

1) bringing the halogen-containing flame-retardant resin composition into contact with a dehalogenation material and a dehalogenation promoting material at a temperature not lower than 200° C. and lower than the thermal decomposition temperature of the resin composition, and 2) recovering the styrene.

16. A method for treating a halogen-containing flame-retardant resin composition, in which the flame-retardant resin composition comprises a phenol resin and a bromine-containing flame retardant;

the method comprising 1) bringing the halogen-containing flame-retardant resin composition into contact with a dehalogenation material and a dehalogenation promoting material at a temperature not lower than 200° C. and lower than the thermal decomposition temperature of the resin composition, whereby phenolic oligomers are produced; and 2) recovering bromine.

17. A method for treating a halogen-containing flame-retardant resin composition, in which the flame-retardant resin composition comprises an unsaturated polyester resin and a bromine-containing flame retardant;

the method comprising 1) bringing the halogen-containing flame-retardant resin composition into contact with a dehalogenation material and a dehalogenation promoting material at a temperature not lower than 200° C. and lower than the thermal decomposition temperature of the resin composition, whereby carboxylic acids and glycols are produced; and 2) recovering bromine.

18. The dehalogenation treatment method of a halogen-containing flame-retardant resin composition as set forth in any one of claims 1 to 12, and 15–10, wherein the dehalogenation material is at least one substance selected from the group consisting of tetralin, sodium hypophosphite, sodium thiosulfate, ascorbic acid, hydrazine, dimide, formic acid, aldehydes, saccharides, hydrogen sulfide, lithium, calcium, magnesium, zinc, iron, titanium, aluminum lithium hydride, lithium hydride, hydrogenated diisobutylaluminum, alcoholic potassium, metal alkoxides, amines, and potassium iodide.

19. The dehalogenation treatment method of a halogen-containing flame-retardant resin composition as set forth in any one of claims 1 to 12 and 15 to 10, wherein the contact of the halogen-containing flame-retardant resin composition with the material mixture is contact with the material mixture in the liquid phase or/and the vapor phase.

20. The dehalogenation treatment method of a halogen-containing flame-retardant resin composition as set forth in any one of claims 1 to 12 and 15 to 10, wherein the method comprises a step of eliminating oxygen from the contact ambient atmosphere prior to the contact of the halogen-containing flame-retardant resin composition with the material mixture containing the dehalogenation material and the dehalogenation promoting material.

21. The dehalogenation treatment method of a halogen-containing flame-retardant resin composition as set forth in claim 20, wherein the step of eliminating oxygen is a replacement step of replacing the gas of the ambient atmosphere with nitrogen gas by sending nitrogen gas and/or a pressure decrease step of decreasing the pressure by evacuating the gas of the ambient atmosphere by gas discharge.

22. The dehalogenation treatment method of a halogen-containing flame-retardant resin composition as set forth in any one of claims 1 to 12 and 15 to 10, wherein substances generated by bringing the halogen-containing flame-retardant resin composition into contact with the material mixture containing the dehalogenation material and the dehalogenation promoting material are passed through an alkaline solution.

23. The dehalogenation treatment method of a halogen-containing flame-retardant resin composition as set forth in any one of claims 1 to 12 and 15 to 10, wherein the halogen composes at least one compound selected from the group consisting of decabromodiphenyl ether, tetrabromobisphenol A, 2,2-bis(4-hydroxy-3,5-dibromophenyl)propane, hexabromobenzene, tris(2,3-dibromopropyl)isocyanurate, 2,2-bis(4-hydroxyethoxy-3,5-dibromophenyl)propane, perfluorocyclodecanethylenebis(pentabromobenzene), ethylene bistetrabromophthalimide, hexabromocyclododecane, halogen-containing pyrophosphates, paraffin chloride, pentabromotoluene, octabromodiphenyl oxide, tetrabromophthalic anhydride, brominated (alkyl)phenols, tris(tribromophenoxy)triazine, brominated polystyrene, octabromotrimethylphenylindane, pentabromobenzyl acrylate, polydibromophenylene oxide, bis(tribromophenoxyethane), tetrabromobisphenol A-epoxy oligomer/polymers, tetrabromobisphenol A-carbonate oligomers, tetrabromobisphenol A-bis(2,3-dibromopropyl ether), tetrabromobisphenol A-bis(allyl ether), and tetrabromobisphenol S.

* * * * *

UNITED STATES PATENT AND TRADEMARK OFFICE

CERTIFICATE OF CORRECTION

PATENT NO. : 6,903,242 B2
APPLICATION NO. : 09/898338
DATED : June 7, 2005
INVENTOR(S) : Takahiko Terada et al.

It is certified that error appears in the above-identified patent and that said Letters Patent is hereby corrected as shown below:

Column 27

Line 61, "1 to 7" should read -- 1, 2, 6 and 7 --.

Column 28

Line 61, "1 to 12, and 15-10" should read -- 1, 2, 6, 7 and 12, and 15, 16, 17, 4, 9, 5 and 10.

Column 29

Line 6, "1 to 12 and 15 to10" should read -- 1, 2, 6, 7 and 12, and 15, 16, 17, 4, 9, 5 and 10.

Line 12, "1 to 12 and 15 to10" should read -- 1, 2, 6, 7 and 12, and 15, 16, 17, 4, 9, 5 and 10.

Line 27, "1 to 12 and 15 to10" should read -- 1, 2, 6, 7 and 12, and 15, 16, 17, 4, 9, 5 and 10.

Column 30

Line 7, "1 to 12 and 15 to10" should read -- 1, 2, 6, 7 and 12, and 15, 16, 17, 4, 9, 5 and 10.

Signed and Sealed this

Twentieth Day of May, 2008

JON W. DUDAS
*Director of the United States Patent and Trademark Office*